July 4, 1933.  H. D. CHURCH  1,916,855

TRANSMISSION

Filed Jan. 30, 1928   2 Sheets-Sheet 2

INVENTOR
Harold D Church
BY
Richey Watts
ATTORNEY

Patented July 4, 1933

1,916,855

UNITED STATES PATENT OFFICE

HAROLD D. CHURCH, OF CLEVELAND, OHIO, ASSIGNOR TO THE WHITE MOTOR COMPANY, OF CLEVELAND, OHIO, A CORPORATION OF OHIO

TRANSMISSION

Application filed January 30, 1928. Serial No. 250,546.

This invention relates broadly to transmissions and more specifically to speed change gearing mechanisms of the type adapted for use upon automotive vehicles.

One of the objects of this invention is to construct a transmission of the selective gear type in which there is incorporated a driven element adapted to be operatively co-ordinated with either of two similar driving elements, which are driven at relatively variable speeds.

Another object of this invention is to arrange the driving elements and their appurtenances in minimized lineal aggroupment so that relatively short driving shafts may be employed to support the gear trains.

Another object of this invention is to construct a transmission mechanism, of the sliding gear type, in which the selective gear elements are so correlated with their component adjuncts as to afford a relatively short movement of the actuating mechanism therefor.

Another object of this invention is to arrange an organization of rotatable driving elements, in a transmission mechanism, with a similar organization of simultaneously rotatable driving elements so certain driven elements may be electively engaged with either of the driving elements.

Other objects and advantages reside in the specific construction and aggroupment of the elements peculiar to this structure, as will become apparent from a more complete examination of this specification in the claims of which there are assembled and pointed out certain combinations of parts and specific constructions indicative of the scope and spirit of the invention.

Figure 1:
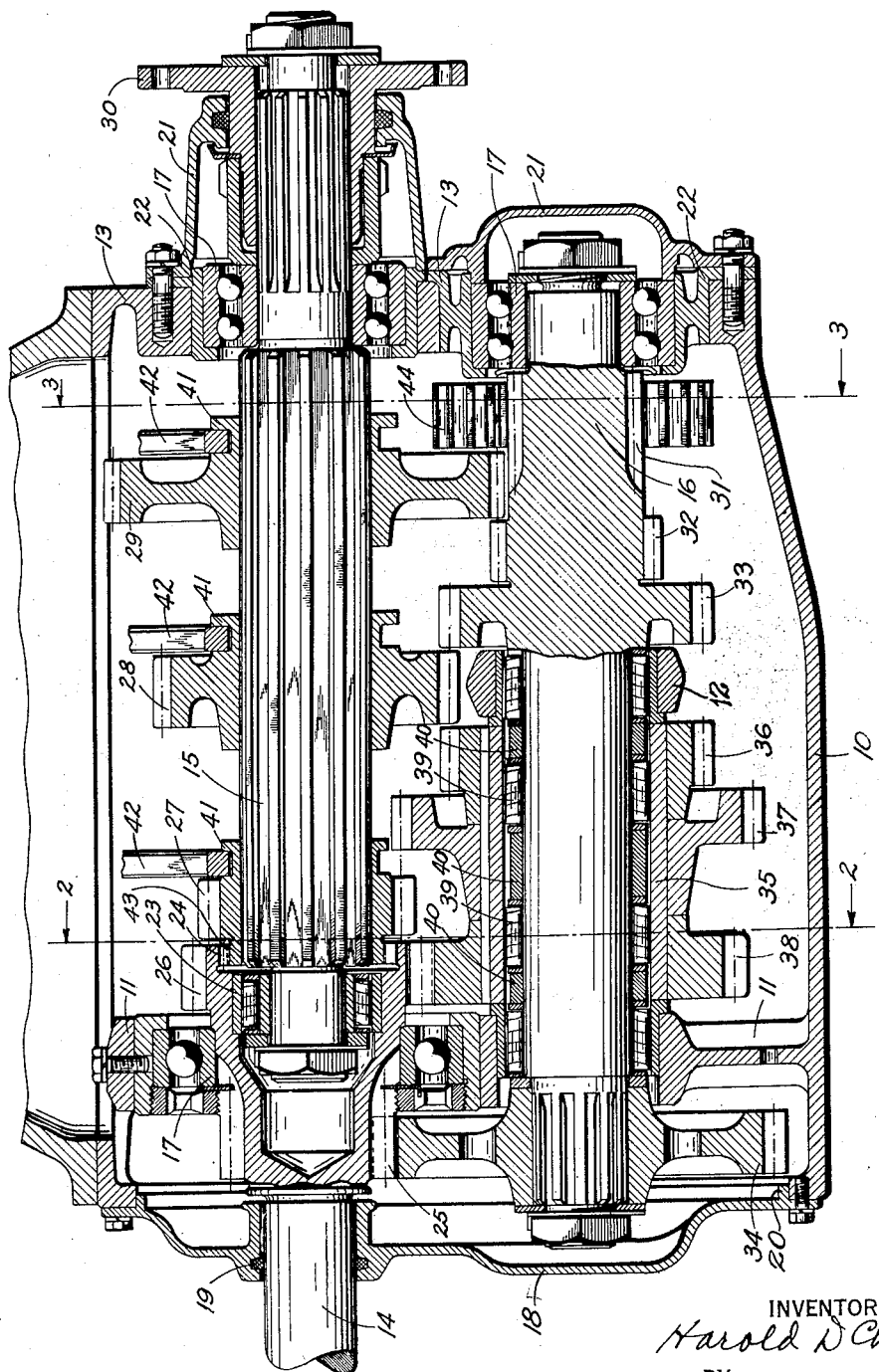
Figure 2:
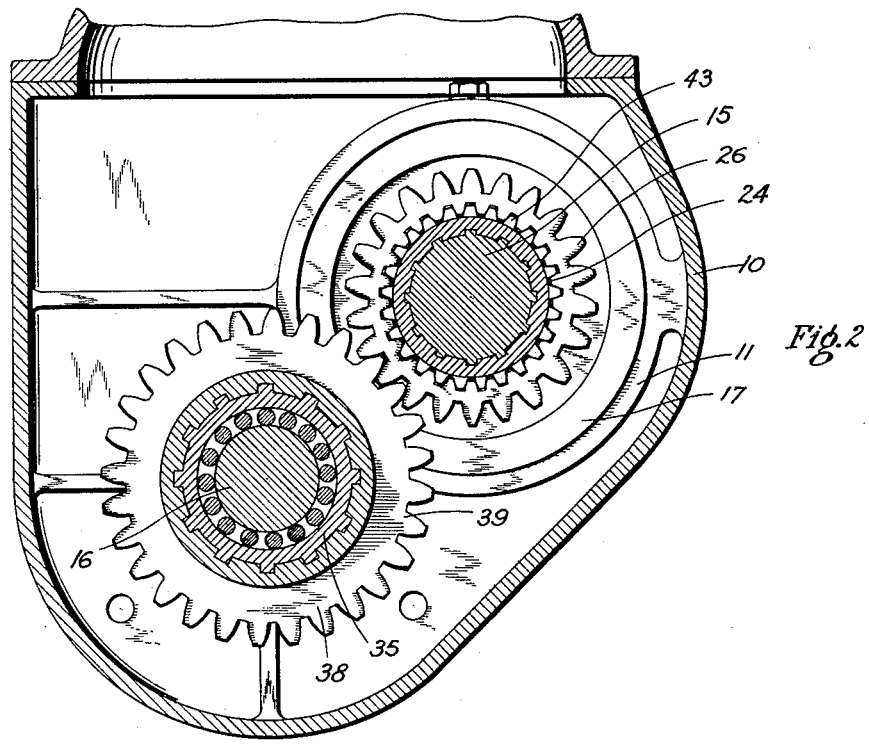
Figure 3:
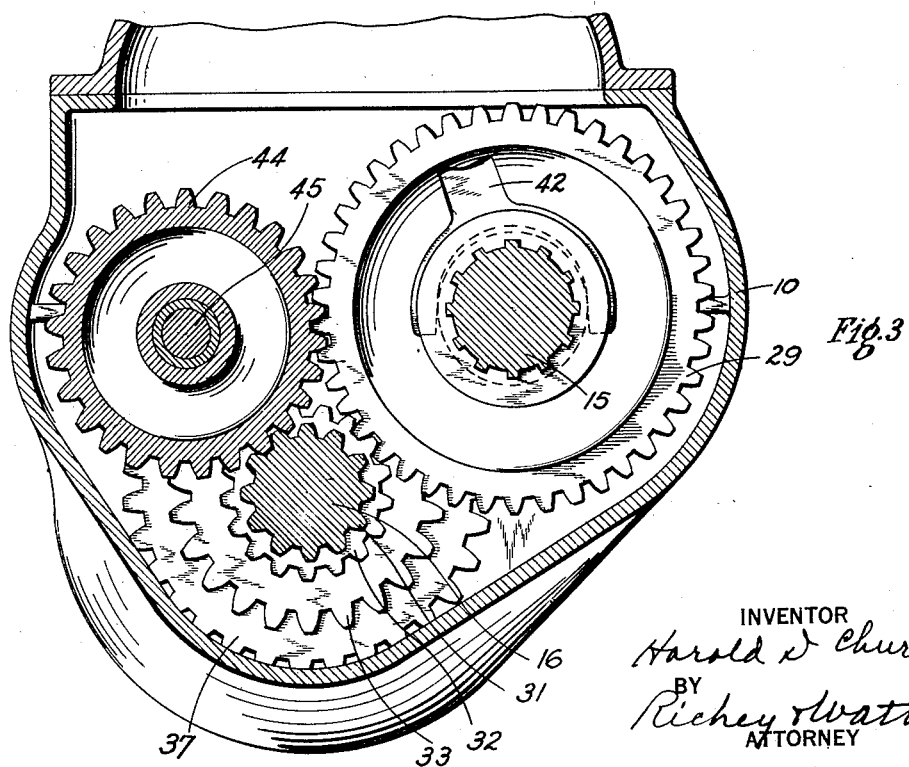

In the accompanying drawings:

Fig. 1 is a longitudinal section through a transmission gear mechanism embodying the principles of my invention, certain of the elements being shown in elevation;

Figs. 2 and 3 are transverse sectional views on planes represented respectively by the lines 2—2 and 3—3 of Fig. 1 looking in the direction of the arrows.

The transmission case, made in conformity with this invention, comprises a housing 10 having transversely disposed bearing bosses 11 and 12 and an apertured outer end wall 13, all of these elements being suitably machined to receive and support the usual and necessary accessorial adjuncts employed in a transmission case.

The gear trains, embodied in the speed change gearing mechanism, are mounted upon a driving shaft 14, a driven shaft 15 and a counter shaft 16, these shafts being supported in anti-friction bearings 17 interjacent the bosses 11, and 12 and the apertures within the end wall 13 respectively. The inner end of the transmission housing is provided with a separable cover plate 18 which is formed with an oil tight packing ring 19, surrounding the driving shaft 14, and with a flange 20 extended within the open end of the housing 10. The outer end wall 13 of the casing, is provided with cover plates 21 which are employed in conjunction with the bearing cups 22 to retain the anti-friction bearings 17, and to seal the end of the casing.

The driving shaft 14 is formed with an enlarged terminating end which is suitably counter bored to accommodate the reception of the free end of the driven shaft 15 and also an anti-friction pilot bearing 23. Contiguous the bearing 23 and formed within the counter bored end of the shaft 14 there is a clutch element 24, constructed in the instant case, with toothed engaging members, as best illustrated in Figure 2. In the outer perimeter of the shaft 14 and conterminous to the enlarged end thereof there are two spur gears 25 and 26, both being integrally formed in the shaft, and each disposed adjacent a bearing seat formed in the shaft 14 to support the anti-friction bearing 17.

The driven shaft 15 is splined substantially throughout its length, the inner splined portion being provided to support the sliding gears 27, 28 and 29, and the outer end adapted to maintain a driving flange 30.

The counter-shaft 16 is constructed, in the instant case, with a spur gear 31 integrally formed in the body of the shaft, adjacent its outer end and contiguous the bearing 17. Intermediate the gear 31 and the bearing boss 12 there are two spur gears 32 and 33, the gear 33 being the larger of the two and positioned adjacent the bearing boss 12. The inner end of the counter-shaft is splined to receive a gear 34 which is vertically aligned and intermeshed with the pinion 25 on the driving shaft 14.

Upon the counter-shaft 16 and intermediate the bearing bosses 11 and 12 there is a sleeve or secondary counter-shaft 35 which is formed with a splined perimeter to accommodate the mounting of the spur gears 36, 37 and 38. The sleeve 35 is preferably bored throughout its length, the diameter of the bore being suitably proportioned with the diameter of the shaft 16 to afford the intromission of the anti-friction bearings 39 and the spacing collars 40.

Each of the gears 27, 28 and 29 is provided with integral grooved collars 41 in which yokes 42 are suitably engaged. The yokes may be of any conventional type and are coupled, likewise in a conventional manner with a suitable operating lever, not shown.

The gear 27 is formed with a clutch element 43 of the gear type, upon the face opposite the collar 41, the element being complemental to the internally toothed clutch member and adapted to be operatively associated therewith.

As shown in Figures 1 and 3 there is an idler gear 44 mounted on a shaft 45 suitably supported in the gear case 10 and disposed, in relation to the counter-shaft 16, to permit constant driving engagement between the pinion 31 and the idler gear 44.

In the practice of this invention direct drive is effectuated through the engagement of the clutching members 24 and 43 wherein the driving shaft 14 is united with the driven shaft 15 through the actuation of the clutch carrying gear 27. The power transmission is adjusted in "first gear" when the sliding gear 29 is shifted into mesh with the pinion 32, the power in this case being transmitted from the shaft 14 through the gears 25 and 34 to the shaft 16 and through the gearing 32 and 29 to the driven shaft 15, the clutching members 24 and 43 obviously being disengaged prior to the adjustment of the gear 29. "Second gear" is obtained by sliding the gear 28 into engagement with the counter-shaft gear 33, the order of the power transmission herein being similar to that of "first gear". Sliding the same gear, that is the driven gear 28 in the opposite direction and meshing it with the spur gear 36 will effectuate the "third gear" drive, the power transmission in this case being through the shaft 14 pinion 26 gear 38, counter-shaft 35, the gear 36 and consequently causing the rotation of the gear 28 and the driven shaft 15. The "fourth gear" drive is obtained by sliding the gear 27 in the opposite direction from that of the direct drive and causing its engagement with the gear 37, the drive herein being effected through the gears 26, 38, the counter-shaft 35 and the gears 37 and 27. Reverse gear is obtained by shifting the gear 29 in the opposite direction to that of "first gear" and thereby engaging it with the idler pinion 44 which in turn effects the drive from the shaft 14 through the gear set 25, 34, 31, 44 and 29.

It should be noted in respect to the gear rates between the second and third drive that the pinions 33 and 36 are the same pitch diameters but that the relative rotation speed of the two gears is obtained through the ratios of the correlated driving pinions on the shaft 14 and counter-shafts 16 and 35 respectively.

Although the foregoing description is necessarily of a detailed character, in order that the invention may be completely set forth, it is to be understood that the specific terminology is not intended to be restrictive or confirming, and that various rearrangements of parts and modifications of structural detail may be resorted to without departing from the scope or spirit of the invention as herein claimed.

What is claimed:

1. In a transmission mechanism the combination of a driving shaft provided with a plurality of gears, a driven shaft comprising a splined portion and having a plurality of gears movably mounted thereon, a counter-shaft provided with gearing, one gear of which is in constant mesh with one of the driving shaft gears, a second counter-shaft comprising a sleeve rotatable upon said first countershaft provided with gearing, one gear of which is in constant mesh with one of the driving shaft gears, one of said driven shaft gears being electively engageable with either of a pair of similar gears associated respectively with each of the said counter-shafts.

2. In a transmission mechanism the combination of a driving shaft provided with a plurality of gears, a driven shaft comprising spindle portions and an intermediate splined portion, said driven shaft being in axial alignment with said driving shaft and having its free end journaled thereon, gears movably mounted upon the splined portion of said driven shaft, a counter-shaft provided with gears, one of which is in constant engagement with the said driving shaft, a second counter-shaft telescopically supported upon the first counter-shaft and provided with gears one of which is in constant engagement with the driving shaft, one of the movable gears upon the driven shaft being engageable with contiguous gears carried respectively by the first and second counter-shaft.

3. In a transmission mechanism, a main shaft and two coaxial countershafts, the entire length of one of said countershafts occupying a portion of the length of the other, a gear on one end of the shorter countershaft, a bearing for the longer countershaft adjacent said gear, a gear on the longer countershaft adjacent said bearing, said gears being fixed for rotation with their respective countershafts, a gear circumferentially fixed but longitudinally movable upon the main shaft having its neutral position within the space defined by said bearing but selectively movable into mesh with either of said countershaft gears.

4. In a transmission, the combination of a driving shaft, a driven shaft, a pair of co-axial counter shafts independently driven by said driving shaft, and means common to both of said counter-shafts to drive the said driven shaft.

5. In a transmission, the combination of a driving shaft having a pair of gears thereon, a driven shaft, a pair of co-axial counter shafts, each of said countershafts having a gear thereon meshing with one of said gears on said driving shaft, other gears on said counter shafts, and a sliding gear on said driven shaft arranged to selectively mesh with one of said other gears on each of said counter shafts.

6. In a transmission, the combination of a driving shaft, a driven shaft, an inner counter shaft having constant mesh gearing engagement with said driving shaft, an outer counter shaft surrounding said inner counter shaft and having constant mesh gearing engagement with said driving shaft, a sliding gear and clutch on said driven shaft adapted to engage either said driving shaft or a gear on said outer counter shaft, and another sliding gear on said driven shaft adapted to engage a gear on said inner counter shaft.

7. In a transmission, the combination of a driving shaft, a driven shaft, inner and outer co-axial counter shafts, each having constant mesh gearing engagement with said driving shaft, a sliding gear and clutch member on said driven shaft adapted to engage either said driving shaft or a gear on said outer counter shaft, a second sliding gear on said driven shaft adapted to engage a gear on said outer countershaft, and a third sliding gear on said driven shaft adapted to engage a gear on said inner counter shaft.

8. In a transmission, the combination of a driving shaft, a driven shaft, inner and outer co-axial counter shafts having constant mesh gearing engagement with said driving shaft, a sliding gear and clutch member on said driven shaft adapted to engage either said driving shaft or a gear on said outer counter shaft, a second sliding gear on said driven shaft adapted to engage either a gear on said outer counter shaft or a gear on said inner counter shaft, and a third sliding gear on said driven shaft adapted to engage a gear on said inner counter shaft.

In testimony whereof I hereunto affix my signature this 17th day of January, 1928.

HAROLD D. CHURCH.